Feb. 22, 1955   F. M. MacDOUGALL   2,702,723
CONSTANT SUPERHEAT TIME LAG EXPANSION VALVE
Filed April 27, 1950
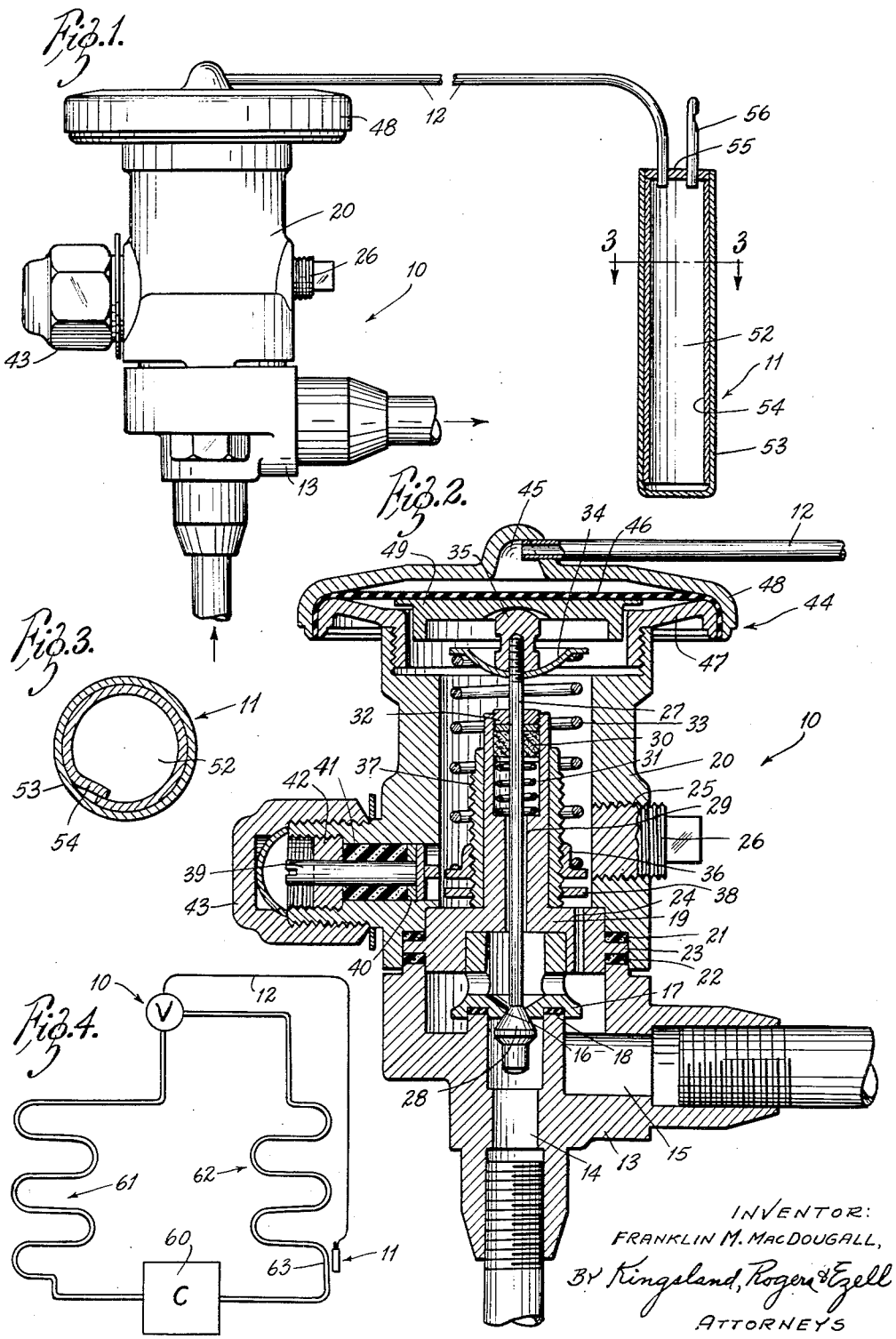
INVENTOR:
FRANKLIN M. MacDOUGALL,
BY Kingsland, Rogers & Ezell
ATTORNEYS

United States Patent Office 2,702,723
Patented Feb. 22, 1955

2,702,723

CONSTANT SUPERHEAT TIME LAG EXPANSION VALVE

Franklin M. MacDougall, Kirkwood, Mo., assignor to Alco Valve Company, University City, Mo., a corporation of Missouri Application April 27, 1950, Serial No. 158,373

4 Claims. (Cl. 297—3)

The present invention relates to a thermally controlled valve, and more particularly to a thermally controlled expansion valve as used in a standard refrigerating system.

It is an object of the invention to provide a valve of the foregoing type having a thermal element whose wall construction is such as to render the valve insensitive to momentary changes of temperature, yet permitting the valve to respond faithfully to temperature changes of a more prolonged nature and thus to compensate accurately with respect to the average temperature. Especially is it an object to provide a valve of this type that will provide a relatively slow opening response and a relatively rapid cut off.

The invention finds useful application in the control of refrigerating cycles of the "constant superheat" type. In this application, the function of the thermal element is to apply an actuating force to the expansion valve, which force is proportioned to the temperature of the refrigerant at a critical point in the system. If the force thus applied is such as to follow very rapidly slight changes of temperature at the critical point, there will be a tendency toward over-compensation, which in itself would produce a temperature change at the critical point such as to require opposite valve action. In such a case, the system will tend to "hunt" a position of equilibrium whenever load demands are changed or, what is even more detrimental, whenever momentary temperature fluctuations from extraneous causes may occur. The remedy lies in providing an appropriate time delay between changes of refrigerant temperature at the critical point and application of a compensating force on the valve without the sacrifice of accurate response to the average temperature at the critical point. The present invention fulfills these requirements.

In the drawings:

Figure 1 is an elevation of an expansion valve with attached thermal bulb shown in section;

Figure 2 is a diametrical section through the expansion valve of Figure 1 on an enlarged scale;

Figure 3 is an enlarged section through the bulb, taken on the line 3—3 of Figure 1; and Figure 4 represents diagrammatically a standard refrigeration system.

The expansion valve of the present invention includes a main valve portion 10, a remote bulb 11 and a connecting tube 12. The main valve assembly 10 includes a main body 13 in Figure 2 having an inlet chamber 14 and an outlet chamber 15. A metering orifice 16 assembled coaxially with the inlet chamber serves as a "gate" between the inlet chamber and the outlet chamber. The orifice body 17 is effectively gasketed with respect to the common wall of the inlet and outlet chambers by a pressure gasket 18, thus restricting fluid flow between the chambers to that which is permitted through the orifice. The orifice body 17 is retained in position by a retaining sleeve 19 which is itself retained with respect to the main body 13 by an upper housing 20. Pressure gaskets 21 and 22, contiguous to an outer flange 23 of the retaining sleeve, serve to prevent leakage of fluid through the joint between the main body and the upper housing. An open passage 24 through the retaining sleeve 19 may or may not be provided for a purpose that will appear.

An opening 25 in the wall of the upper housing 20 may or may not be utilized for a purpose to appear and, when not utilized, is effectively closed by a plug 26.

A metering rod 27 having a conically shaped head or valve 28 passes through the metering orifice 16, its alignment being maintained coaxial with the orifice by means of a longitudinal bore 29 within the retaining sleeve 19. The conical head 28 of the metering rod is so positioned with respect to the metering orifice 16 as to permit a clear annular passage through which fluid may flow, the transverse area of the passage being infinitely variable, by longitudinal movement of the metering rod, between zero and a maximum depending upon the diameter of the stem of the metering rod.

Fluid leakage between the outlet chamber and the upper housing through the longitudinal bore 29 of the retaining sleeve 19 may be prevented by a suitable pressure packing arrangement such as a packing 30 acted upon by a compression spring 31 and retained by appropriate retaining washers 32.

A helical compression spring 33 arranged to act between the fixed parts of the valve, including the metering orifice 16 and the movable parts of the valve, including the metering rod 27, is retained at its active end by a plate washer 34 and a cap nut 35, and at its fixed end by an adjustable traveling plate 36. The traveling plate is adjustable by means of a threaded sleeve 37, a threaded rotating plate 38, a slotted adjusting stem 39, and other parts not clearly shown in the figure, the detailed manner of adjustment not being pertinent to the present invention, it being understood, however, that changes in the force exerted by the spring are capable of being effected by rotation of the slotted adjusting stem 39. Fluid leakage through the opening provided in the upper body for the adjusting stem 39 is prevented by an appropriate pressure packing arrangement such as that comprising a washer 40, compressible packing 41, and a packing nut 42. A protective cap 43 guards the adjusting means from dirt and mechanical damage.

The upper end (as shown) of the upper body 20 is closed by an actuating assembly 44 suitably attached to the upper body so as to prevent leakage from the upper body. The actuating assembly essentially provides an enclosed chamber with a movable wall. In Figure 2, an enclosed chamber 45 has as its movable wall a diaphragm 46. Structurally, the actuating assembly comprises, besides the diaphragm 46, a collar 47 adaptable to attachment with the upper housing 20, an external housing 48 forming a stationary wall of the enclosed chamber 45, and a bearing plate 49 for the purpose of translating movement of the diaphragm to the metering rod cap nut 35 without detrimental distortion of the diaphragm itself. The diaphragm 46 is so sealed at its periphery between the collar 47 and the external housing 48 as to prevent leakage of fluid from either side of the diaphragm.

Communicating with the interior of the enclosed chamber 45 and sealed into the fixed wall thereof, as shown in Figure 2, the tube 12 leads to the thermal bulb 11, as shown in Figure 1. The bulb end of this tube communicates with the chamber of the thermal bulb, as shown in Figure 1.

The thermal bulb 11, shown in section in Figure 1, provides an enclosed chamber 52 of substantially constant volume, i. e., with walls relatively immovable with respect to the enclosed volume. Additionally, the main wall construction is such as to reduce the rate of flow of heat from the evaporator outlet through the walls of the bulb, without interfering with the ultimate equalization of bulb and suction line temperatures. These two features, substantially constant volume and reduction of rate of heat flow through the principal walls, are prime requisites in the construction of the bulb, whereas the shape, the materials, and the details of construction may be varied widely. For the purpose of illustration, a seamless vial 53 has inserted therein a tubular liner 54, shown in Figure 3, to consist of a rolled and lapped sheet of material having relatively low heat conductivity, as for example a sheet of asbestos. The open end of the vial is closed by a disc 55 appropriately sealed into the opening. The bulb end of the aforementioned tube 12 is sealed into the disc 55 as is likewise a tube 56, the function of the latter being to add or withdraw fluid from the bulb chamber after which the tube 56 may be permanently crimped to prevent leakage.

Operation

In Figure 4, the valve is shown diagrammatically in a typical refrigeration system. There is a compressor 60 with its outlet connected to a condenser 61. The condenser leads to the expansion valve 10, and the outlet of the valve 10 connects into the inlet of an evaporator 62, the outlet of which connects back to the compressor 60.

The function of the expansion valve is to regulate the flow of refrigerant to the evaporator of the refrigerating system. In a constant superheat system, the refrigerant, as it passes through the expansion valve and enters the evaporator is in a liquid state; in other words, the temperature of the refrigerant is lower than its boiling point corresponding to the pressure within the system at this point. As the refrigerant passes through the evaporator, however, its temperature is raised due to absorption of heat from the "load" so that not only does the refrigerant boil off completely and form a gas, but the resultant gas itself experiences a temperature rise above the saturation temperature of the refrigerant and becomes superheated.

Inasmuch as maximum efficiency in the refrigerating cycle demands on the one hand complete vaporization of the refrigerant and on the other hand a minimum degree of superheat, it is customary so to regulate the flow of refrigerant through the evaporator that the refrigerant reaches the evaporator outlet (63 in Figure 4) at a temperature corresponding to a predetermined degree of superheat sufficient only to insure complete vaporization under operating conditions. Obviously, if the rate of refrigerant flow through the evaporator is increased without an increase in refrigerating load, the temperature at the evaporator outlet will fall due to the inability of the load to vaporize and superheat an increased quantity of refrigerant. If, on the other hand, the refrigerant flow is decreased without change in load, the temperature at the evaporator outlet will increase due to the relatively earlier vaporization of the refrigerant and the longer contact with the heat conducting walls of the evaporator. In similar manner, it may be seen that changes in the heat load will require alterations in the flow of refrigerant if the predetermined degree of superheat, as required for best over-all efficiency, is to be maintained.

Inasmuch as the pressure within the refrigerating system at the outlet of the evaporator is a function of the varying rate of refrigerant flow, it is obvious that the saturation temperature of the refrigerant will vary in substantial proportion to pressure changes within the system. This means that the temperature corresponding to a constant degree of superheat will likewise be a function of pressure within the system, and it is therefore necessary to employ pressure, as well as temperature, as an actuating force on the expansion valve.

It will be noted from Figure 2 that fluid flowing through the expansion valve must flow through the aforementioned annular passage formed by the conically shaped head or valve 28 of the metering rod 27 and the metering orifice 16. It will be noted further that the size of the annular passage, and consequently the rate of flow through the valve, is susceptible to variation by movement of the metering rod coaxially with respect to the orifice. Finally, it will be noted that, inasmuch as the force exerted by the compression spring 33 acting through the plate washer 34, the cap nut 35, and the bearing plate 49 is such as to maintain the metering rod in fixed relation with the movable wall or diaphragm 46, the position of the metering rod with respect to the orifice will depend upon the position of the diaphragm relative to the fixed parts of the valve and that movement of the conical head 16 with respect to the orifice will be effected only by movement of the diaphragm.

The position of the diaphragm during operation of the valve is determined by the action upon it of three forces. One force is that due to the loading action of the spring 33 which acts upward against the diaphragm as the illustration is drawn. After appropriate adjustment by the means provided, this force may be considered to remain substantially constant during operation of the valve. A second force also acting upward is that due to pressure existing in the outlet chamber 15, this pressure being transmitted directly to the diaphragm by way of the open passage 24 through the interior of the upper housing 20. Alternatively, a second force similar in action to that above described and derived from the pressure existing within the evaporator outlet may be applied by way of the opening 25 in the wall of the upper body, in which case the open passage 24 would normally be eliminated. The third force is that due to pressure existing in the enclosed chamber 45, one wall of which is the diaphragm itself. This force, acting downward against the diaphragm, opposes the first and second forces. If, as mentioned, the first force remains constant during operation of the valve, it is obvious that movement of the diaphragm will be effected only by differential variations of the second and third forces.

Since the saturation temperature of the refrigerant in the evaporator depends upon the pressure at this point in the system, it follows that the fluid pressure against the lower side of the diaphragm at any time will correspond to the saturation temperature within the evaporator. Then, if the valve is to fulfill its function of regulating the refrigerant flow to maintain a constant degree of superheat at the evaporator outlet, the pressure exerted on the upper side of the diaphragm must correspond to a temperature exceeding the existing saturation temperature within the evaporator by an amount equal to the desired degree of superheat. Thus, by reflecting temperature at the evaporator outlet as pressure on the upper side of the diaphragm, a fixed relation may exist between the difference in fluid pressures on the diaphragm and the degree of superheat, regardless of the pressure actually existing in the evaporator. Obviously, the force exerted by the spring will correspond to the difference between the fluid pressures when the valve is in equilibrium and adjustably controls therefore the degree of superheat to be maintained. It is the function of the thermal bulb 11 to control the pressure exerted on the upper side of the diaphragm.

Referring once more to Figure 2, it will be evident from the position of the conical head 28 relative to the orifice opening 16 that a downward movement of the diaphragm will result in an enlargement of the annular passage between the cone and the orifice, thus permitting an increased rate of flow through the valve. Conversely, an upward movement of the diaphragm will effect a decreased rate of flow through the valve. By extension then, an increase in pressure within the enclosed chamber 45 will tend to effect an increased rate of flow through the valve, and similarly a decrease in pressure within the thermal bulb will tend to effect a decreased rate of flow. Since the thermal bulb chamber 52, the inclosed chamber 45, and the interconnecting tube 12 constitute a sealed system of substantially constant volume which, being charged with an appropriate mechanically fluid substance, is subject to the first law of thermodynamics, it follows that changes in the heat content of the thermal charge will be accompanied by change of pressure within the sealed system, including the enclosed chamber 45. By reason of its position with respect to the evaporator outlet 63 (Figure 4), the thermal bulb causes the thermal charge to be affected by temperature changes at this point, heat transfer between the evaporator outlet and the thermal charge being interchangeably effected in accordance with the second law of thermodynamics. Thus the metering action of the valve becomes responsive to temperature changes at the evaporator outlet. If the temperature at the outlet becomes greater than the temperature of the thermal charge, heat is transferred to the charge, and the rate of flow through the expansion valve tends to be increased as above described; if the temperature at the outlet becomes less than the temperature of the thermal charge, heat is transferred from the charge and the rate of flow through the expansion valve tends to be decreased.

The rate of transfer of heat between the evaporator outlet and the thermal charge will depend (not exclusively) upon the thermal conductivity of the intervening substances. Consequently the rapidity with which changes in flow through the valve may be effected by changes in temperature at the evaporator outlet will likewise be a function of the thermal conductivity of these substances, or ultimately of the heat conductance of the principal walls. Inasmuch as it is an object of the present invention to render a degree of insensitivity to momentary fluctuations in temperature at the evaporator outlet, provision is made in the wall construction of the thermal bulb definitely to retard the flow of heat from or to the thermal charge. It will be seen, however, that, notwithstanding the retardation of heat flow as above described, the ultimate temperature of the thermal charge will closely approximate the average temperature to which the bulb itself is subjected, thus retaining desired accuracy of control.

For the condition of initial opening of the valve, as when the refrigerating cycle is being started, the action of the spring 33 combined with any residual pressure against the lower side of the diaphragm 46 will maintain the valve in closed position until the temperature of the thermal charge attains a temperature corresponding to the desired degree of superheat at the evaporator outlet. Here, the relatively inefficient transfer of heat from the superheated refrigerant to the wall of the evaporator outlet combined with the retarding characteristic of the wall of the thermal bulb will result in a relatively slow opening action of the valve. Compared to this action, the closing action of the bulb will be accelerated due to the much greater efficiency of heat transfer between the evaporator outlet wall and the refrigerant, since the latter, for the condition of valve closure, will approach the evaporator outlet in a liquid state. The foregoing is true of both the liquid charged bulbs, in which there is a thermal liquid volume in the bulb greater than the volume of the diaphragm expansion chamber plus the tube, and of the gas filled bulbs, containing only a small quantity of thermal fluid. Also, where a so-called gas charged bulb is used, wherein there is only a small quantity of liquid present at lower temperatures, the control point in the bulb is the coldest point. On heating of the bulb, the liquid will evaporate when the entire bulb mass, including the slowly heated asbestos, is heated above the particular boiling point of the liquid under conditions within the bulb. On cooling, however, a cold point may quickly develop in the metal of the bulb, producing rapid condensation of the gas, and quick shutting off of the valve.

A feature of the present invention lies in the disposition of the insulating member on the inside of the metal wall of the thermal bulb. Such a construction is particularly appropriate to installations wherein the thermal bulb is attached to the outside of the evaporator outlet (or the suction line) inasmuch as it permits direct metal to metal contact between the wall of the bulb and the wall of the evaporator outlet. The relatively high coefficient of thermal conductivity of the contiguous walls enables the whole metallic portion of the wall of the thermal bulb quickly to attain a temperature approximating that of the refrigerant at the evaporator outlet and thus to present maximum area for heat transmission to or from the thermal charge. Contrasted to previous attempts to retard the action of the thermal bulb by inserting spacers or blocks of insulating material between the evaporator outlet and the thermal bulb, this feature provides a more uniform response to small temperature differences with consequent greater accuracy of control throughout the range of operating temperatures.

What is claimed is:

1. In a thermostatically operated device, an expansible chamber having a movable wall, a temperature sensing bulb, a tube connecting the bulb and the chamber into a closed system, a vaporizable thermal fluid in the system, said fluid being at least partially condensed at the low temperature range to which said sensing bulb is subjected, and fluid contacting insulating material disposed around the inner surface of the bulb in the form of a lining, said lining being of a thickness substantially less than the radius of the bulb to provide an open space in the interior of said bulb, the insulating material being of a kind having closely associated component parts providing small, fluid-permeable interstices, and being insoluble in the thermal fluid.

2. In an expansion valve having thermal control, a thermal sensing bulb for enclosing an expansible fluid having a cylindrical outer wall into which is inserted a fluid contacting rolled sheet of asbestos for the purpose of providing retardation of heat flow from and to an enclosed vaporizable thermal charge, said charge being at least partially condensed at the low temperature range to which said sensing bulb is subjected.

3. A thermal sensing bulb adapted for use with an expansion valve having a thermal control, said sensing bulb enclosing an expansible vaporizable thermal fluid and having an outer wall for engagement with a portion of a refrigeration system to respond to temperature changes thereat, and a fluid contacting sheet of asbestos within the bulb for the purpose of providing retardation of heat flow between the outer wall and the enclosed vaporizable thermal charge, said sheet being thinner than the internal radius of said bulb to provide a substantial open space in the interior of said bulb, and said charge being at least partially condensed at the low temperature range to which said sensing bulb is subjected.

4. A thermal sensing bulb for use in a constant superheat refrigerating system having a time lag expansion valve for controlling the rate of flow of refrigerant through the system, said bulb enclosing an expansible vaporizable thermal fluid and having an outer wall of metal and a contiguous inner fluid contacting wall of insulating material, said insulating material being of a small thickness relative to the internal radius of said bulb to provide a substantial open space in the interior of said bulb, and said insulating material further being of a kind having closely associated component parts providing small, fluid-permeable interstices, and being insoluble in the thermal fluid.

References Cited in the file of this patent

UNITED STATES PATENTS

| Number | Name | Date |
|---|---|---|
| Re. 23,706 | Lange | Sept. 1, 1953 |
| 853,505 | Eddy | May 14, 1907 |
| 1,502,590 | Sager | July 22, 1924 |
| 1,994,983 | De Florez et al. | Mar. 19, 1935 |
| 2,079,579 | Shrode | May 4, 1937 |
| 2,242,334 | Wile | May 20, 1941 |
| 2,385,243 | Wiegers | Sept. 18, 1945 |
| 2,573,151 | Lange | Oct. 30, 1951 |
| 2,577,902 | McGrath | Dec. 11, 1951 |
| 2,577,903 | McGrath | Dec. 11, 1951 |